(12) United States Patent
Kipp (10) Patent No.: US 10,309,557 B2
(45) Date of Patent: Jun. 4, 2019

(54) GRIPPING DEVICE AND METHOD OF USING

(71) Applicant: Brian Michael Kipp, Valparaiso, IN (US)

(72) Inventor: Brian Michael Kipp, Valparaiso, IN (US)

(73) Assignee: Brian Michael Kipp, Valparaiso, IN (US)

( * ) Notice: Subject to any disclaimer, the term of this patent is extended or adjusted under 35 U.S.C. 154(b) by 3 days.

(21) Appl. No.: 15/924,882

(22) Filed: Mar. 19, 2018

(65) Prior Publication Data

US 2018/0216756 A1 Aug. 2, 2018

Related U.S. Application Data

(62) Division of application No. 15/167,343, filed on May 27, 2016, now Pat. No. 9,982,803.

(60) Provisional application No. 62/166,764, filed on May 27, 2015.

(51) Int. Cl.
| | |
|---|---|
| *F16L 5/10* | (2006.01) |
| *F16L 5/00* | (2006.01) |
| *E04G 15/06* | (2006.01) |
| *E03C 1/02* | (2006.01) |
| *F16L 5/02* | (2006.01) |

(52) U.S. Cl.
CPC ............... *F16L 5/00* (2013.01); *E03C 1/021* (2013.01); *E04G 15/061* (2013.01); *F16L 5/10* (2013.01); *F16L 5/02* (2013.01)

(58) Field of Classification Search
CPC .. F16L 5/00; F16L 5/027; F16L 37/008; F16L 37/252; F16L 41/088; Y10T 29/49895; E03C 1/021; E04G 15/061
See application file for complete search history.

(56) References Cited

U.S. PATENT DOCUMENTS

| | | | | | |
|---|---|---|---|---|---|
| 2,954,248 | A | * | 9/1960 | Brickman | F16C 1/107 248/56 |
| 3,415,549 | A | * | 12/1968 | Chatham | F16C 1/262 285/140.1 |
| 4,976,457 | A | * | 12/1990 | Carter | F16L 5/08 285/136.1 |
| 5,090,644 | A | * | 2/1992 | Lenker | F16L 5/00 174/153 G |
| 5,118,057 | A | * | 6/1992 | Martin | H02G 3/065 174/153 G |
| 5,588,681 | A | * | 12/1996 | Parks | E03C 1/025 137/359 |
| 5,702,076 | A | * | 12/1997 | Humber | F16L 5/00 248/56 |
| 7,387,288 | B2 | * | 6/2008 | Hull | F16L 25/0045 249/91 |

(Continued)

*Primary Examiner* — Nkeisha Smith
(74) *Attorney, Agent, or Firm* — Hartman Global IP Law; Gary M. Hartman; Domenica N. S. Hartman (57) ABSTRACT

Gripping devices and methods for accommodating a piping (e.g., a pipe stub) having a predetermined size, automatically gripping the piping as the piping is pushed through the gripping device, supporting and securing the piping at a predetermined orientation (e.g., perpendicular) to a through-structure as the piping passes through a hole in the through-structure, and thereafter maintaining the piping at the predetermined orientation.

22 Claims, 8 Drawing Sheets

(56) References Cited

U.S. PATENT DOCUMENTS

| | | | | |
|---|---|---|---|---|
| 7,582,836 | B2* | 9/2009 | Tapper | H02G 3/083 |
| | | | | 16/2.1 |
| 8,256,736 | B2* | 9/2012 | Lin | F16B 5/0208 |
| | | | | 248/56 |
| 9,261,129 | B2* | 2/2016 | Herrema | F16L 41/12 |
| 9,517,712 | B1* | 12/2016 | Masanek, Jr. | B60N 3/044 |
| 2011/0037252 | A1* | 2/2011 | Brandt | F16L 5/027 |
| | | | | 285/139.3 |
| 2013/0064734 | A1* | 3/2013 | Allen | A61B 50/20 |
| | | | | 422/300 |
| 2014/0367532 | A1* | 12/2014 | Cichon | F16L 5/00 |
| | | | | 248/74.1 |
| 2015/0048613 | A1* | 2/2015 | Bauer | F16L 5/00 |
| | | | | 285/192 |

* cited by examiner

GRIPPING DEVICE AND METHOD OF USING

CROSS REFERENCE TO RELATED APPLICATIONS

This is a division patent application of co-pending U.S. patent application Ser. No. 15/167,343, filed May 27, 2016, which claims the benefit of U.S. Provisional Application No. 62/166,764, filed May 27, 2015. The contents of these applications are incorporated herein by reference.

BACKGROUND OF THE INVENTION

The present invention generally relates to plumbing pipe supports, and more particularly to addressing problems associated with supporting and securing piping, preferably so that the piping has a desired orientation (e.g., perpendicular) to a structure as the piping passes through a hole in the structure and so that the piping remains at the desired orientation. The invention finds particular application to pipe stubs that supply water to plumbing fixtures above a floor, for example, of a type commonly found in residential and commercial buildings.

Water pipe stubs (also referred to as water supply stubs, stub downs, stub ups, stub outs, floor stubs, etc.), hereinafter referred to as pipe stub(s) or simply stub(s), are commonly found in buildings, for example, in houses, hotels, etc. Pipe stubs exist in a range of sizes (diameters), for example, about 0.5 to 6 inches (about 1 to 15 cm), and may be formed of various materials, for example, copper, PEX, and CPVC. When installed to supply water to plumbing fixtures above a floor, pipe stubs are typically required to have lengths sufficient to extend from the plumbing fixture or plumbing fixture stop valve above the floor to a joist space below the floor and to further allow the portion of the stub below the floor to be "worked," in other words, bent and/or attached to another pipe, for example, to make a horizontal run. As nonlimiting examples, common lengths for stubs are about six inches (about 15 cm) to about three feet (about one meter). If a stub is to be installed down through the floor, a clamp or bracket is often used to hold the stub. However, as soon as the stub is dropped into a hole to connect to piping below, the stub will often either free fall through the hole to the level below or become misaligned relative to the floor as a result of off-axis (i.e., transverse) forces applied when working the stub below the floor.

Various approaches have been employed during construction to address the problem described above, including the use of straps and pipe suspension clamps specifically adapted to secure a pipe passing through a joist or floor, for example, "mickey mouse" hangers, J-hooks, etc. In addition, U.S. Pat. Nos. 7,010,889 and 7,784,234 relate to clamping and supporting pipes and U.S. Pat. No. 5,702,076 discloses a clamp adapted to hold a pipe and insulate that pipe as it passes through a steel stud.

BRIEF DESCRIPTION OF THE INVENTION

The present invention provides gripping devices and methods suitable for accommodating a piping (e.g., a pipe stub) having a predetermined size, automatically gripping the piping as the piping is pushed through the gripping device, supporting and securing the piping at a predetermined orientation (e.g., perpendicular) to a through-structure as the piping passes through a hole in the through-structure, and thereafter maintaining the piping at the predetermined orientation.

According to one aspect of the invention, a gripping device includes a body having a sleeve portion having a cylindrical internal passage through which the piping can be inserted. The internal passage has a cross-sectional diameter and an axial length sufficient for the sleeve portion to maintain a central axis of the piping substantially parallel to a central axis of the sleeve portion when the piping is subjected to an off-axis force transverse to the central axis of the piping. The gripping device further includes at least one gripping feature adapted to grip the piping when inserted into the internal passage of the sleeve portion. The gripping feature is either located internally within the internal passage of the sleeve portion or located externally of the internal passage at an opening of the passage. The gripping feature is cantilevered toward the central axis of the sleeve portion to define an effective diameter that is less than the diameter of the internal passage.

According to another aspect of the invention, a method is provided for using a gripping device, for example, comprising the features discussed above. Such a method includes performing one or more steps such that the sleeve portion of the gripping device is within a hole in a through-structure, inserting a piping through the internal passage of the sleeve portion so that the gripping feature grips the piping and supports the weight of the piping, and working the piping on one side of the through-structure while the gripping device maintains the piping at the predetermined orientation on an opposite side of the through-structure.

Other aspects and advantages of this invention will be better appreciated from the following drawing descriptions.

DETAILED DESCRIPTION OF THE INVENTION

FIGS. 1 through 12 represent gripping devices corresponding to certain nonlimiting embodiments of the present invention. It should be noted that the drawings are drawn for purposes of clarity when viewed in combination with the following description, and therefore are not necessarily to scale. To facilitate the description provided below of the embodiments represented in the drawings, relative terms, including but not limited to, "vertical," "horizontal," "lateral," "front," "rear," "side," "forward," "rearward," "upper," "lower," "above," "below," "right," "left," etc., may be used in reference to a typical installation of the gripping devices when used to secure a pipe stub through a floor of a building, and therefore are relative terms that are useful to describe installations of the gripping devices represented in the drawings, but should not be otherwise interpreted as limiting the scope of the invention. Furthermore, the invention will be described in reference to supporting and securing piping, and the term "piping" as used herein encompasses various forms of plumbing conduit, for example, used in water supply lines (e.g., pipe stubs), drain lines, and vent lines commonly found in building construction.

Figure 1:
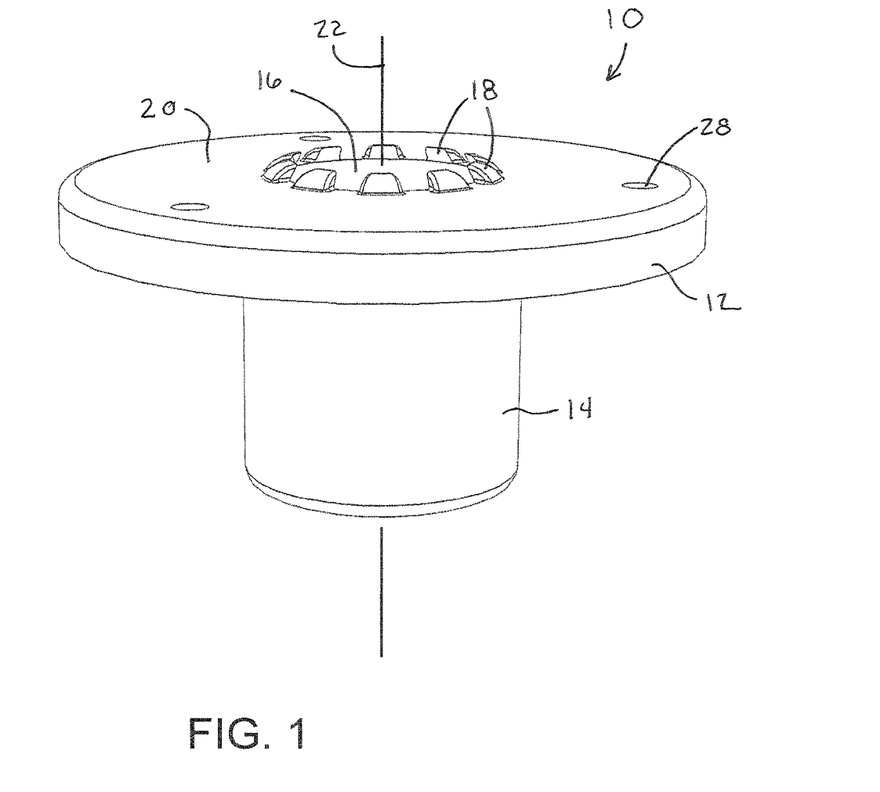
FIG. 1 schematically represents a perspective view of a gripping device in accordance with a nonlimiting embodiment of this invention.
Figure 2:
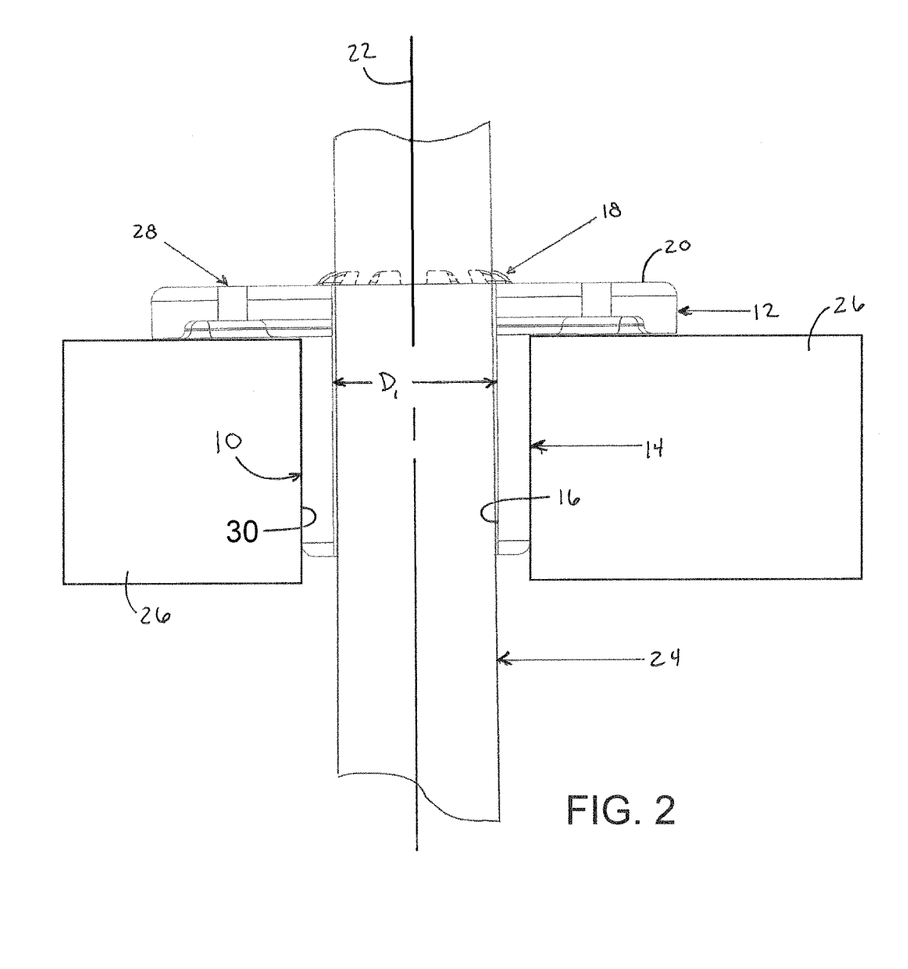
FIG. 2 schematically represents in cross-section a pipe stub passing through a floor and secured thereto with the gripping device of FIG. 1.
Figures 3, 4, 5:
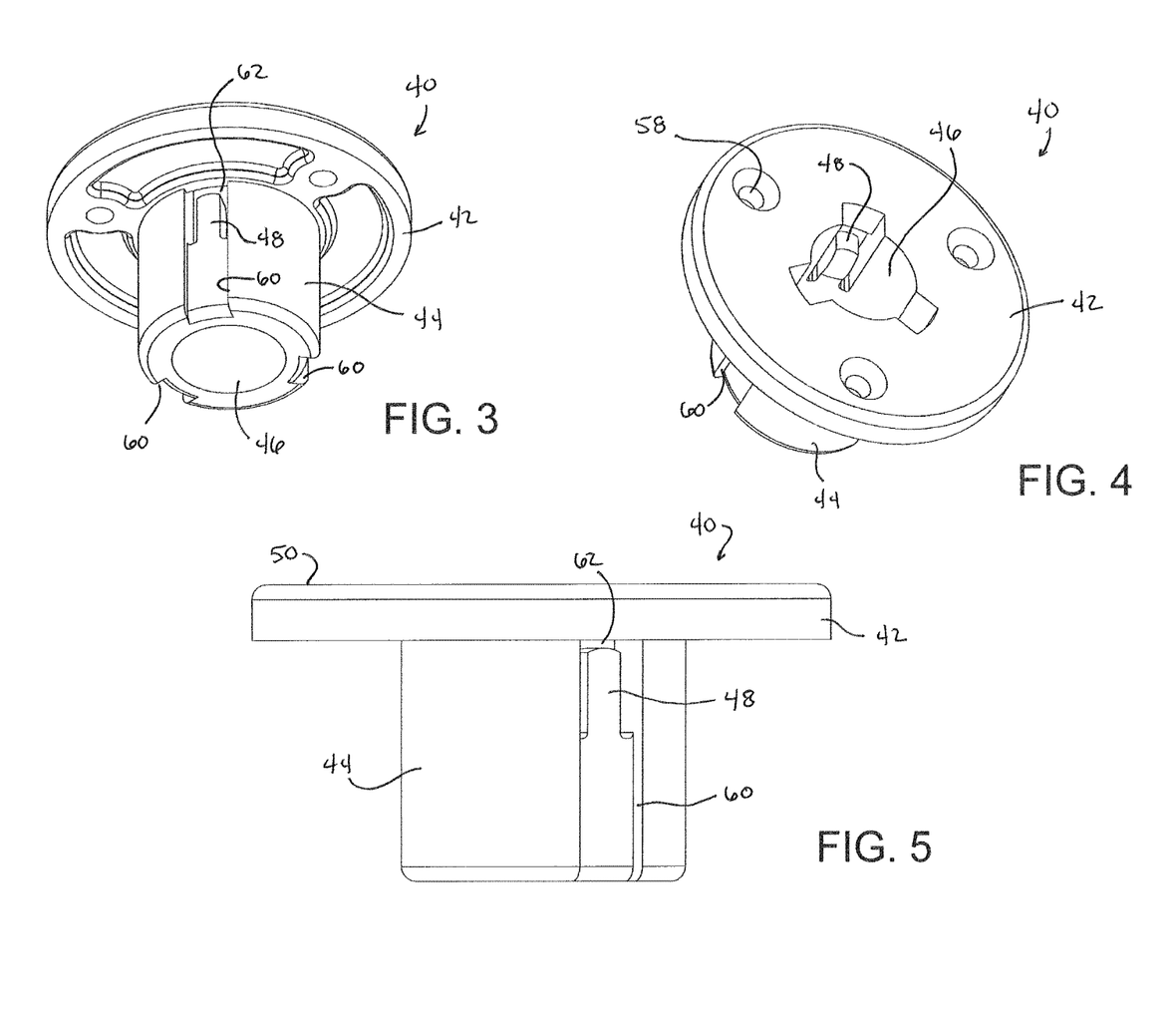
FIGS. 3 and 4 schematically represent perspective views of a gripping device in accordance with another nonlimiting embodiment of this invention.
FIGS. 5, 6 and 7 schematically represent side, top, and bottom views of the gripping device of FIGS. 3 and 4.
Figure 6:
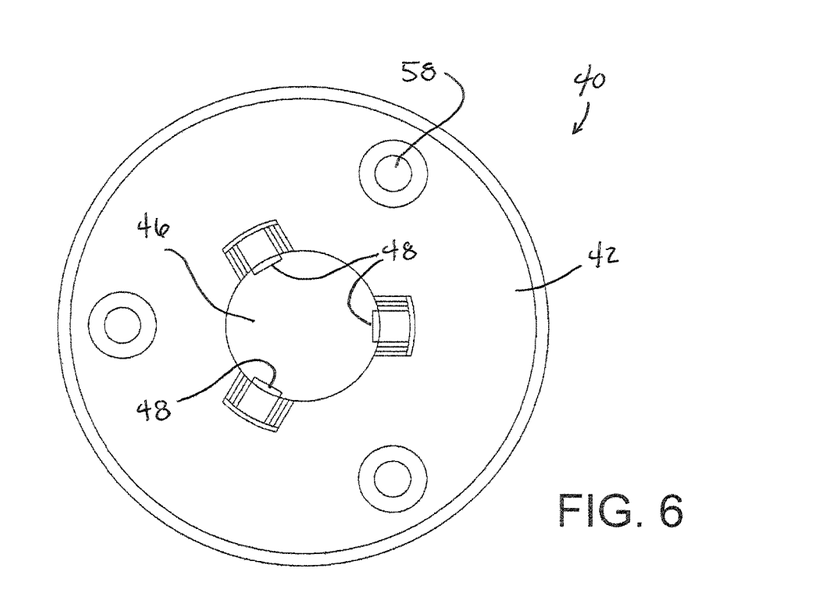
Figure 7:
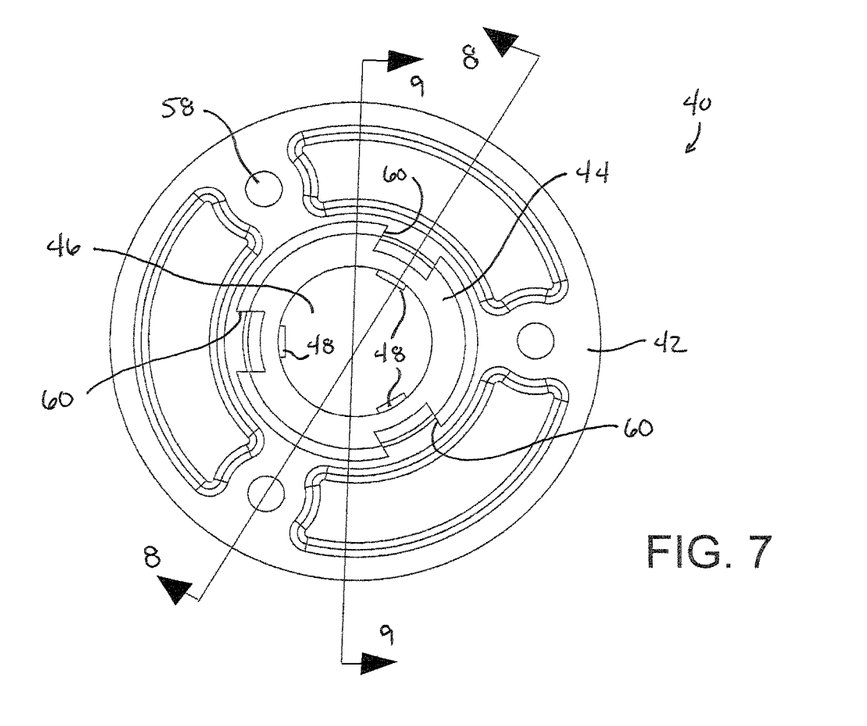
Figure 8:
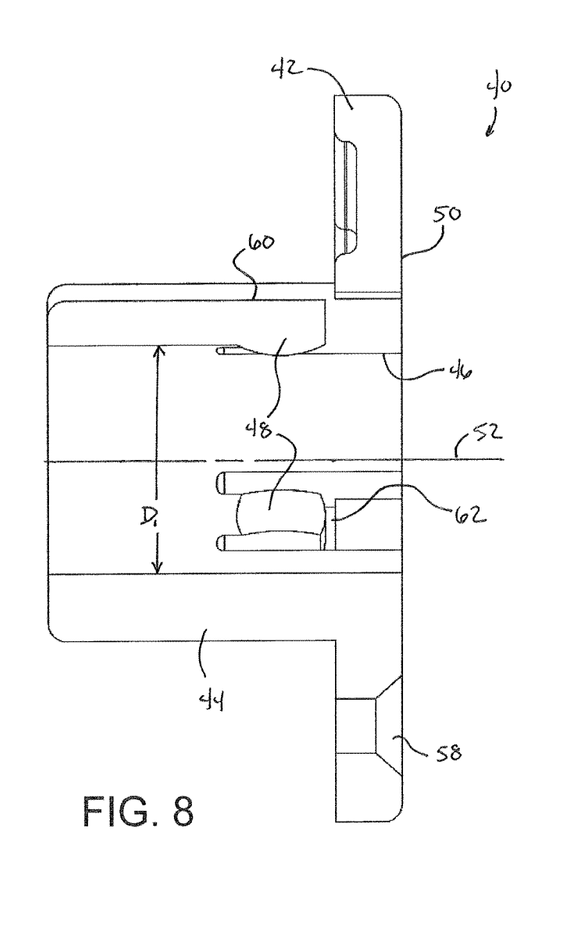
FIGS. 8 and 9 schematically represent cross-sectional views of the gripping device of FIGS. 3 through 7 along, respectively, lines 8-8 and 9-9 of FIG. 7.
Figure 9:
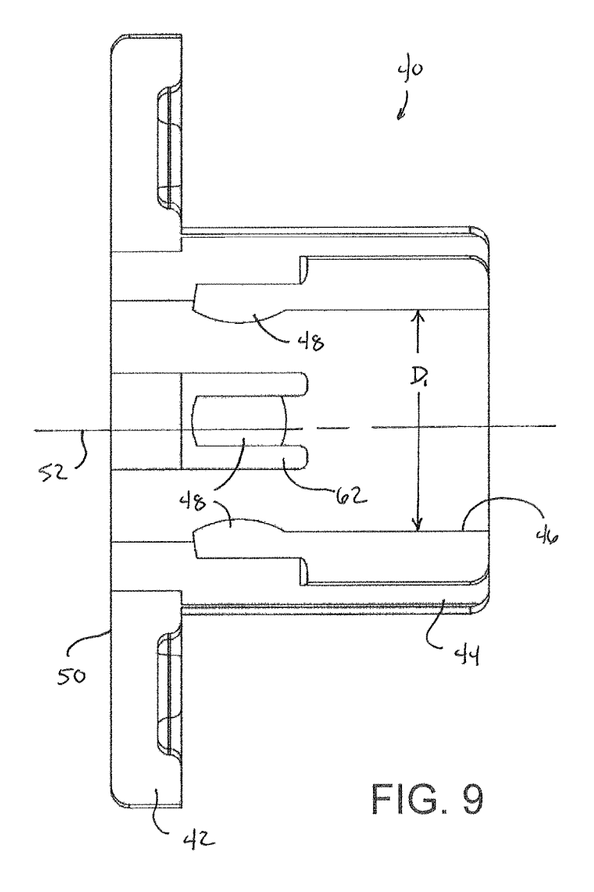

FIG. 1 represents a perspective view of a gripping device 10 having a flanged and sleeved body for securing a length of piping, for example, a pipe stub, within an opening in a floor, joist, stud, wall, etc., (hereinafter simply referred to as a "through-structure") through which the piping must pass in order to convey water (or another fluid) from one side of the through-structure to another. The body of the device 10 may be an assembly or, more preferably, a one-piece unit as shown in FIG. 1, for example, a single part molded of a polymeric material. The body includes a flange portion 12 having a generally planar shape, and a sleeve portion 14 projecting from one side of the flange portion 12, for example, at an angle perpendicular to the plane of the flange portion 12. The flange portion 12 is represented as having a circular perimeter, though other shapes are foreseeable. The sleeve portion 14 is configured to have a cylindrical-shaped internal passage 16 through which a piping 24 can be inserted as represented in FIG. 2, such that the piping 24 is gripped by a gripping feature 18 located externally of the internal passage 16 and at an opening of the passage 16 at an upper surface 20 of the flange portion 12. The sleeve portion 14 and its passage 16 have a cross-sectional size (e.g., internal diameter, $D_1$, of the sleeve portion 14 indicated in FIG. 2) and an axial length sufficient for the sleeve portion 14 to secure and stabilize the particular piping 24 of interest, for example, to maintain the central axis of the piping 24 parallel to and possibly coinciding with a central axis 22 of the sleeve portion 14, as represented in FIG. 2. For this purpose, the sleeve portion 14 preferably has a length of at least 0.5 inch (about 1 cm), and in some applications may be sufficient to extend through a majority of the through-thickness of a through-structure 26 in which it is installed. In the embodiment of FIGS. 1 and 2, the internal passage 16 within the sleeve portion 14 can be uninterrupted so that its internal surface is continuous and cylindrical.

The gripping device 10 can be installed in the through-structure 26 by cutting a hole 30 in the through-structure 26, and then inserting the sleeve portion 14 of the device 10 into the hole 30 until the flange portion 12 abuts the surface of the through-structure 26. FIG. 2 shows the gripping device 10 mounted to the through-structure 26 so that the sleeve portion 14 of the device 10 is entirely surrounded and enclosed by the through-structure 26 and the flange portion 12 is supported by a surface of the through-structure 26. The hole 30 can be sized to create an interference fit with the sleeve portion 14 of the gripping device 10. The flange portion 12 is a preferred though optional structural feature of the device 10 for stabilizing the sleeve portion 14 relative to the through-structure 26 in which the device 10 is installed and through which the piping 24 is to pass. The radial extent of the flange portion 12 from the axis 22 of the sleeve portion 14 that is required to stabilize the sleeve portion 14 is generally inversely proportional to the axial contact length between the through-structure 26 and the sleeve portion 14—in other words, a thicker through-structure 26 and longer sleeve portion 14 allows the diameter of the flange portion 12 to be reduced, with sufficiently long sleeve portions 14 potentially allowing for complete elimination of the flange portion 12. The flange portion 12 is represented in FIGS. 1 and 2 as having through-holes 28 with which fasteners (not shown) can be used to secure the device 10 to the through-structure 26.

The gripping feature 18, which is located on a side of the flange portion 12 opposite the sleeve portion 14, defines a gripping area (interference region) that the piping 24 must be pushed past in order to be inserted entirely through the gripping device 10. As evident from FIGS. 1 and 2, the gripping feature 18 comprises multiple individual discrete features (or fingers) that are located and circumferentially spaced apart along the rim of the passage 16 and cantilevered to protrude radially inward over the mouth of the passage 16, such that the feature 18 creates a friction-type hold on the piping 24 as a result of defining an effective diameter that is less than the diameter ($D_1$) of the passage 16. In particular, when the piping 24 is inserted into the passage 16 of the sleeve portion 14, the individual fingers of the gripping feature 18 are elastically forced radially outward from the axis 22 of the sleeve portion 14, creating an interference between the piping 24 and sleeve portion 14 that sufficiently grips the piping 24 so that the weight of the piping 24 can be supported by the device 10 after being pushed through the device 10. Alternatively, the gripping feature 18 may comprise a continuous ring or lip that extends into the sleeve's passage to create a friction-type hold on the piping 24. The diameters of the passage 16 and feature 18 are relatively sized in relation to the outer diameter of the piping 24 so that there is a diametrical clearance between the piping 24 and the sleeve portion 14 (for example, about 0.005 inch (about 0.1 mm), so that the piping 24 is able to freely pass uninhibited through the passage 16 until the gripping feature 18 is encountered. Consequently, after the piping 24 has been inserted through the internal passage 16 of the sleeve portion 14, contact between the piping 24 and device 10 is preferably limited to the gripping feature 18, particularly if the central axis of the piping 24 coincides with the central axis 22 of the sleeve portion 14 (e.g., in the absence of an off-axis force on the piping 24), so that the sleeve portion 14 does not grip the piping 24 but instead serves only to guide the piping 24 through the device 10, and only the gripping feature 18 grips the piping 24. Once the gripping feature 18 engages the outer surface of the piping 24, the gripping feature 18 applies sufficient radially inward compression on the perimeter of the piping 24 to result in sufficient friction to support the weight of the piping 24, for example, a length of about one meter, while allowing an individual installing the piping 24 through the through-structure 26 to move the piping 24 through the device 10 without undue effort, for example, a force in the axial direction of less than 10 lbf (about 44 N). This functionality will depend on, for example, the distance the feature(s) 18 protrude(s) over the passage 16, the material used to form the feature(s) 18, and whether the gripping feature 18 comprising a single or multiple discrete features. These variables can be tailored without undue experimentation to attain the desired functionality.

As evident from FIG. 2, by passing the piping 24 through the internal passage 16 of the sleeve portion 14, which has an internal diameter that is the same as or slightly larger than the diameter of the piping 24, the device 10 is able to maintain the piping 24 in a desired (typically perpendicular) orientation relative to the through-structure 26 as a result the flange portion 12 being fastened to the through-structure 26 and/or the sleeve portion 14 being surrounded by the through-structure 26, the axis 22 of the sleeve portion 14 being at a desired predetermined orientation or angle (e.g., 90 degrees) to the plane of the flange portion 12, a rigid connection between the flange and sleeve portions 12 and 14, a minimal diametrical clearance between the piping 24 and sleeve portion 14, and the sleeve portion 14 being of sufficient length. The device 10 can be used to temporarily grip the piping 24 as it is passed through the hole 30 in the through-structure 26 (for example, a floor when installing a faucet or toilet), and maintain a substantially vertical orientation of the piping 24 above the through-structure 26 while the portion of the piping 24 below the through-structure 26 is being bent to make a horizontal run.

FIGS. 3 through 11 represent a gripping device 40 that has a gripping functionality similar to the embodiment of FIGS. 1 and 2. In view of similarities between these embodiments, the following discussion of FIGS. 3 through 11 will focus primarily on aspects of the embodiment of FIGS. 3 through 11 that differ from the embodiment of FIGS. 1 and 2 in some notable or significant manner. Other aspects of the embodiment of FIGS. 3 through 11 not discussed in any detail can be, in terms of structure, function, materials, etc., essentially as was described for the first embodiment.

Figure 10:
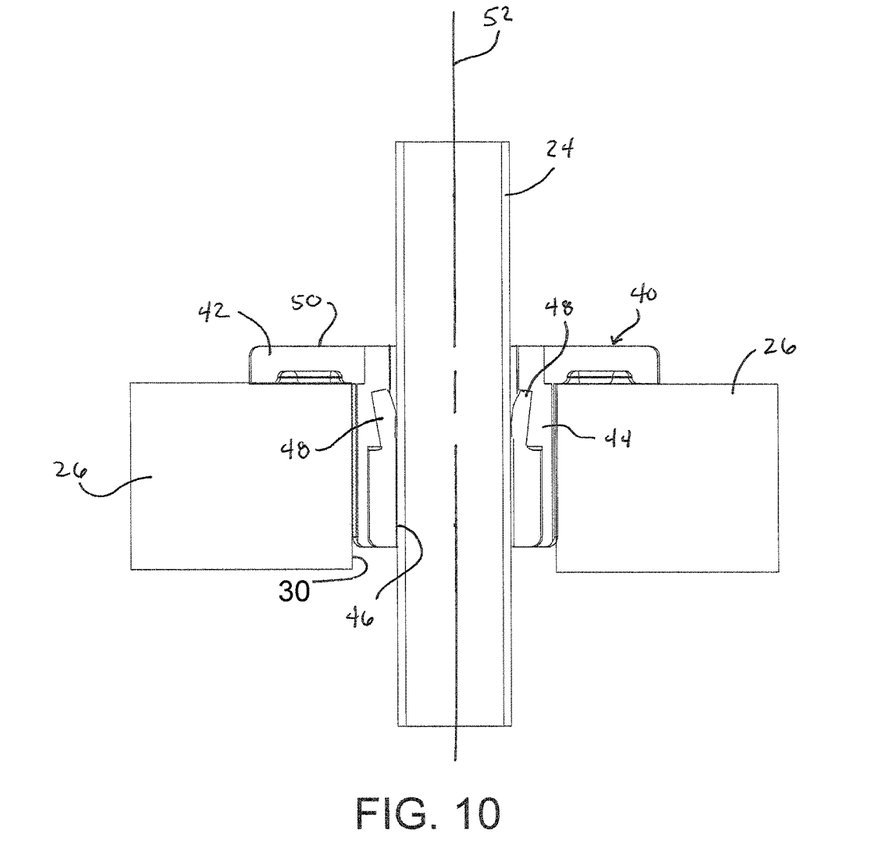
FIGS. 10 and 11 schematically represent in cross-section pipe stubs passing through, respectively, wooden and concrete floors and secured thereto with the gripping device of FIGS. 3 through 9.

The body of the gripping device 40 of FIGS. 3 through 11 is represented as a one-piece unit that includes a flange portion 42, a sleeve portion 44 projecting from one side of the flange portion 42, an internal passage 46 within the sleeve portion 44, and through-holes 58 with which fasteners (not shown) can be used to secure the device 40 to a through-structure 26 (FIG. 10). The gripping device 40 includes several notable features that distinguish it from the gripping device 10 of FIGS. 1 and 2. For example, the gripping device 40 lacks a gripping feature located externally of the internal passage 46, and instead comprises multiple integral gripping features (fingers) 48 that are within the sleeve portion 44 and are cantilevered from the wall of the sleeve portion 44 to protrude into the passage 46 within the sleeve portion 44. When piping 24 is inserted into the passage 46 of the sleeve portion 44, the fingers 48 are elastically forced radially outward from the axis 52 of the sleeve portion 44, creating an interference between the piping 24 and sleeve portion 44 that sufficiently grips the piping 24 so that the weight of the piping 24 can be supported by the device 40. As with the device 10 of FIGS. 1 and 2, there is a diametrical clearance between the piping 24 and the sleeve portion 44 (for example, about 0.005 inch (about 0.1 mm), so that the piping 24 is able to freely pass uninhibited through the passage 46 until the fingers 48 are encountered. Thereafter, contact between the piping 24 and device 40 is preferably limited to the fingers 48, particularly if the central axis of the piping 24 coincides with the central axis 52 of the sleeve portion 44 (e.g., in the absence of an off-axis force on the piping 24), so that the sleeve portion 44 does not grip the piping 24 but instead serves only to guide the piping 24 through the device 40, and only the fingers 48 grip the piping 24. Due to contact being largely if not entirely limited to the fingers 48 and their elastic nature, the fingers 48 are capable of absorbing vibration resulting from movement of the piping 24 relative to the through-structure 26.

The fingers 48 can be seen to have an arcuate surface facing the axis 52 of the passage 46, creating a ramp that the end of the piping 24 encounters and cams against as the piping 24 is forced over and past the fingers 48. It is important that the through-structure 26 does not interfere with the movement of the fingers 46 when the device 40 is installed in a hole 30 in the through-structure 26. For this reason, FIGS. 3 through 11 represent each finger 48 as completely recessed into the outer surface of the sleeve portion 44. In particular, each finger 48 is located within a recess 60 that is axially oriented in the outer surface of the sleeve portion 44. Each finger 48 is also disposed in a window 62 that is defined in the sleeve portion 44 and surrounds the finger 48 on three sides to allow for pivotal movement of the finger 48 relative to the wall of the sleeve portion 44.

FIG. 10 is representative of the gripping device 40 being used to secure the piping 24 in a horizontal through-structure 26 such as a floor of a building or a vertical through-structure 26 such as a joist, wall, etc., of a building. After forming the hole 30 in the through-structure 26, the sleeve portion 44 of the device 40 is inserted into the hole 30 and retained therein with an interference fit or fasteners. The piping 24 can then be passed through the gripping device 40, for example, from beneath the through-structure 26 by forcing the piping 24 up through the passage 46 and past the fingers 48, causing the fingers 48 to elastically deform and pivot radially outward away from the passage 46, as evident from FIG. 10. The fingers 48 apply a sufficient compressive gripping force to the outer surface of the piping 24 to retain the piping 24 in the device 40 and prevent the piping 24 from free-falling under its own weight. The device 40 is able to automatically grip the piping 24 and maintain the piping 24 in a desired predetermined (typically perpendicular) orientation relative to the through-structure 26 as it is passed through the hole 30 in the through-structure 26 (for example, a floor when installing a faucet or toilet), and then substantially maintain the predetermined orientation of the piping 24 relative to the through-structure 26 while a portion of the piping 24 protruding from the device 40 is being bent, for example, when bending a pipe stub to make a horizontal run beneath a floor. The device 40 can be sized to accommodate various types of piping, as a nonlimiting example, a piping having a predetermined size (diameters) within a wide range of sizes, for example, about 0.5 to at least about 6 inches (about 1 to 15 cm), and formed of various materials, for example, copper, PEX, and CPVC.

Figure 11:
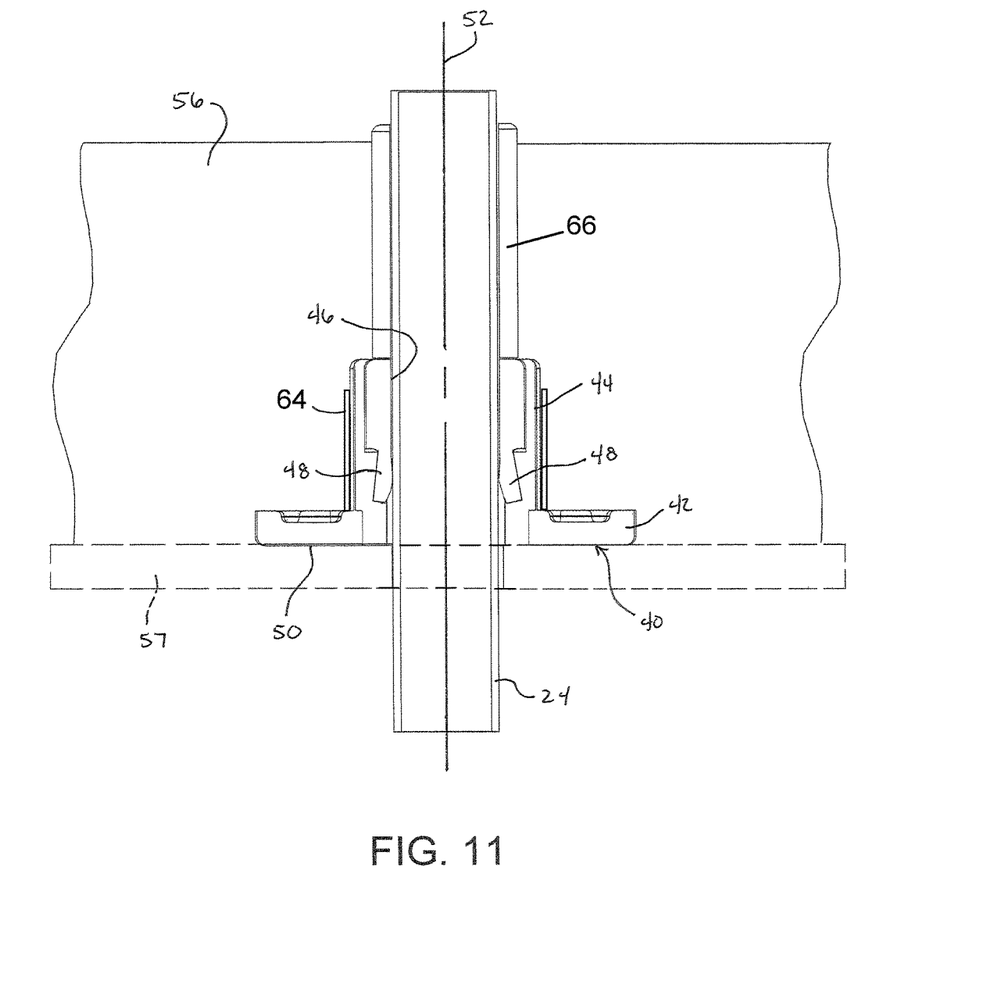

FIG. 11 is representative of the gripping device 40 used to secure the piping 24 in a horizontal through-structure 26 in the form of a poured concrete floor 56 of a building. Instead of the sleeve portion 44 being inserted into a preformed hole as done in FIG. 10, the gripping device 40 is secured, for example, with fasteners (not shown) to a form 57 (shown in phantom) onto which the uncured concrete will be poured, with the sleeve portion 44 facing upward away from the form 57. Prior to pouring the concrete, a sleeve 64 is preferably placed around the sleeve portion 44 of the device 40 to exclude concrete from the recesses 60 and windows 62 so that the concrete floor 56 does not interfere with the operation of the fingers 48. FIG. 11 also shows an extension 66 assembled to the device 40 to permit the pouring of concrete to a thickness greater than the axial length of the sleeve portion 44. After pouring and curing of the concrete to form the floor 56, the form 57 can be removed and the piping 24 can be passed through the gripping device 40, for example, from beneath the floor 56 by forcing the piping 24 up through the passage 46 and past the fingers 48, causing the fingers 48 to elastically deform and pivot radially outward away from the passage 46, as evident from FIG. 11.

Figure 12:
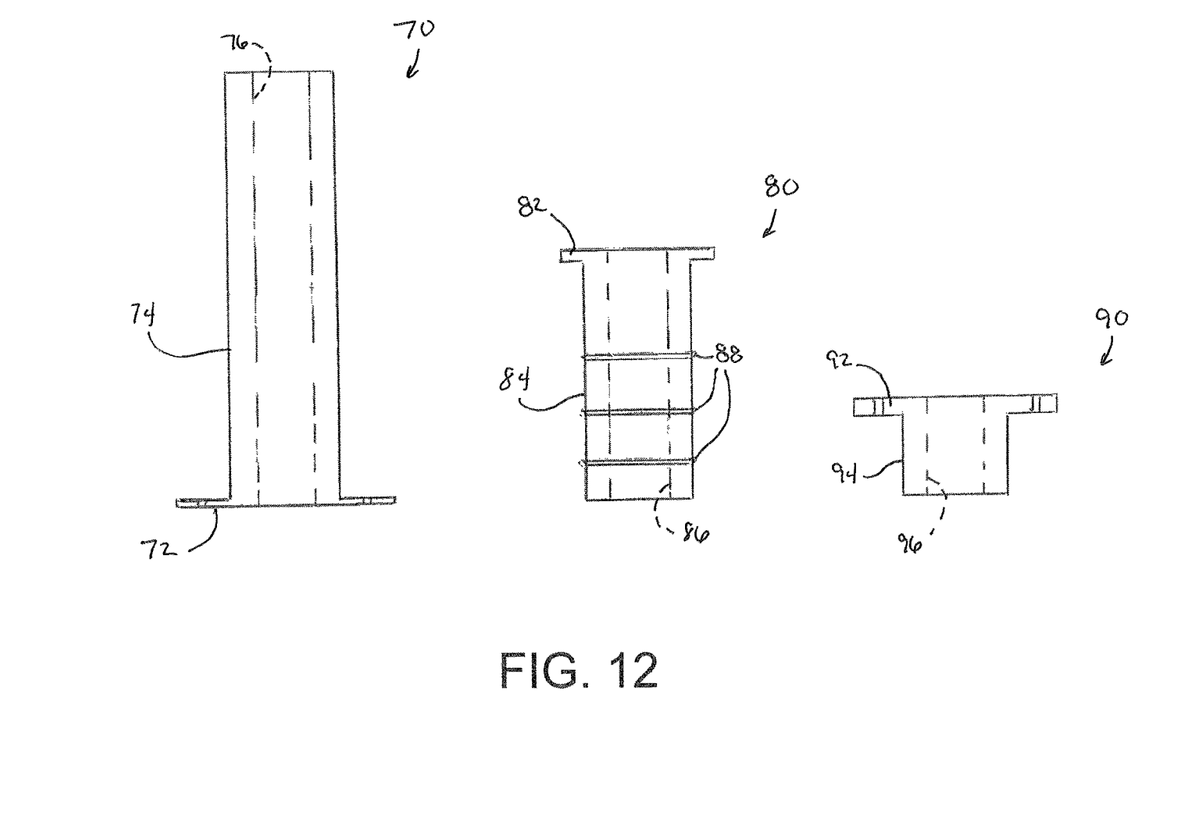
FIG. 12 schematically represent additional configurations and sizes for gripping devices of the type represented in FIGS. 3 through 11.

FIG. 12 depicts three additional configurations for the embodiment of the gripping device 40 represented in FIGS. 3 through 11. These devices, identified by reference numbers 70, 80 and 90, primarily differ on the basis of their outer configurations, but are capable of using the same gripping features, namely, the fingers 48 represented in FIGS. 3 through 11. In view of similarities between these embodiments, the following discussion of FIG. 12 will focus primarily on aspects of the devices 70, 80 and 90 that differ from the embodiment of FIGS. 3 through 11 in some notable or significant manner. Other aspects of the embodiment of devices 70, 80 and 90 not discussed in any detail can be, in terms of structure, function, materials, etc., essentially as was described for the embodiment of FIGS. 3 through 11.

Compared to the other two devices 80 and 90, the gripping device 70 has a longer sleeve portion 74 well suited for use in a concrete floor (for example, 56 in FIG. 11). Due to the length of the sleeve portion 74, the flange portion 72 at the base of the sleeve portion 74 is not required to maintain the orientation of the sleeve portion 74 relative to a concrete floor, but instead the flange portion 72 is only employed to provide means for securing the device 70 to a concrete form (for example, 57 in FIG. 11) or otherwise provide a stable foundation for the sleeve portion 74 while concrete is poured around the sleeve portion 74. Once cured, the concrete floor maintains the orientation of the sleeve portion 74 and, in turn, prevents piping inserted into the device 70 from becoming misaligned if an off-axis force is applied to the piping, such as when bending the piping.

The gripping device 80 has a sleeve portion 84 whose length is intermediate that of the other two devices 70 and 90. For example, the sleeve portion 84 may have a length sufficient to span a wall plate (sill plate, sole plate, or bottom plate of a wall frame) and a floor/deck therebeneath. The flange portion 82 can be used as a positive stop during installation of the sleeve portion 84 into a hole that passes through the wall plate and floor/deck, for example, by impacting with a hammer. The gripping device 80 is represented as having ribs or tabs 88 spaced apart along the length of the sleeve portion 84 to assist in retaining the device 80 in the hole when pushing or pulling the piping through the device 80. As with the device 70, the length of the sleeve portion 84 is responsible for maintaining the orientation of the sleeve portion 84 relative to the plywood floor.

The gripping device 90 has the shortest sleeve portion 94. As with the gripping device 40 of FIGS. 3 through 11, the flange portion 92 of the device 90 is primarily responsible for orienting and maintaining the orientation of the sleeve portion 94 relative to a floor, optionally assisted by a snug fit between its sleeve portion 94 and the hole into which the device 90 is installed.

While the invention has been described in terms of specific embodiments, it is apparent that other forms could be adopted by one skilled in the art. For example, the functions of each component of the gripping devices 10, 40, 70, 80 and 90 could be performed by components of different construction but capable of a similar (though not necessarily equivalent) function, the gripping devices 10, 40, 70, 80 and 90 could differ in appearance and construction from the embodiments shown in the figures, and various materials could be used to form the devices 10, 40, 70, 80 and 90. Therefore, the scope of the invention is to be limited only by the following claims.

The invention claimed is:

1. A plumbing gripping device for accommodating a plumbing piping having a predetermined size, supporting and securing the piping at a predetermined orientation to a through-structure as the piping passes through a hole in the through-structure, maintaining the piping at the predetermined orientation, and automatically gripping the piping as the piping is pushed through the gripping device, the gripping device comprising:

a body having a sleeve portion having first and second ends and a cylindrical internal surface that defines a cylindrical internal passage through which the piping can be inserted, the internal passage having a cross-sectional diameter defined by the cylindrical internal surface, a central axis, and an axial length between the first and second ends of the sleeve portion;

at least one gripping feature located internally within the internal passage of the sleeve portion or located externally of the internal passage at an opening of the passage, the gripping feature being cantilevered and protruding radially inward toward the central axis of the sleeve portion to define an effective diameter that is less than the diameter of the internal passage, the gripping feature being pivotable relative to the sleeve portion so that, in the event the piping is inserted through the internal passage of the sleeve portion, the gripping feature is operable to be forced by the piping radially outward away from the central axis of the sleeve portion to automatically grip the piping and so that the cylindrical internal surface of the sleeve portion is operable to guide the piping through the gripping device and maintain the piping at the predetermined orientation when the piping is subjected to an off-axis force transverse to the central axis of the internal passage; and means for securing the body to the through-structure and retaining the sleeve portion within the hole in the through-structure, the securing and retaining means being a separate and different structure than the gripping feature such that securing the body to the through-structure and retaining the sleeve portion within the hole is independent of the gripping feature gripping the piping.

2. The plumbing gripping device according to claim 1, wherein the securing and retaining means is located on:

the body and comprises fasteners configured to secure the body to the through-structure; and/or the sleeve portion and produces an interference fit between the sleeve portion and the hole in the through-structure.

3. The plumbing gripping device according to claim 1, wherein the internal passage of the sleeve portion is continuous and cylindrical at the first and second ends of the sleeve.

4. The plumbing gripping device according to claim 1, wherein the securing and retaining means comprises ribs or tabs on an outer surface of the sleeve portion.

5. The plumbing gripping device according to claim 1, wherein the gripping feature comprises at least three fingers equi-angularly spaced around the central axis of the sleeve portion so that, in the event the piping is inserted through the internal passage of the sleeve portion, a central axis of the piping coincides with the central axis of the sleeve portion.

6. A plumbing gripping device for accommodating a plumbing piping having a predetermined size, supporting and securing the piping at a predetermined orientation to a through-structure as the piping passes through a hole in the through-structure, maintaining the piping at the predetermined orientation, and automatically gripping the piping as the piping is pushed through the gripping device, the gripping device comprising:

a body having a flange portion and a sleeve portion projecting from one side of the flange portion at an angle to the flange portion, the flange portion having a perimeter, the sleeve portion having a first end adjoining the flange portion, an oppositely-disposed second end, and a cylindrical internal surface that defines a cylindrical internal passage through which the piping can be inserted, the internal passage having a cross-sectional diameter defined by the cylindrical internal surface, a central axis, and an axial length;

at least one gripping feature located internally within the internal passage of the sleeve portion or located externally of the internal passage at an opening of the passage at a surface of the flange portion opposite the sleeve portion, the gripping feature being cantilevered and protruding radially inward toward the central axis of the sleeve portion to define an effective diameter that is less than the diameter of the internal passage, the gripping feature being pivotable relative to the sleeve portion so that, in the event the piping is inserted through the internal passage of the sleeve portion, the gripping feature is operable to be forced by the piping radially outward away from the central axis of the sleeve portion to automatically grip the piping and so that the cylindrical internal surface of the sleeve portion is operable to guide the piping through the gripping device and maintain the piping at the predetermined orientation when the piping is subjected to an off-axis force transverse to the central axis of the internal passage; and means for securing the body to the through-structure and retaining the sleeve portion within the hole in the through-structure, the securing and retaining means being a separate and different structure than the gripping feature such that securing the body to the through-structure and retaining the sleeve portion within the hole is independent of the gripping feature gripping the piping.

7. The plumbing gripping device according to claim 6, wherein the securing and retaining means is located on:
the flange portion and comprises fasteners configured to secure the flange portion to the through-structure; and/or
the sleeve portion and produces an interference fit between the sleeve portion and the hole in the through-structure.

8. The plumbing gripping device according to claim 6, wherein the internal passage of the sleeve portion is continuous and cylindrical at the second end of the sleeve.

9. The plumbing gripping device according to claim 6, wherein the securing and retaining means comprises ribs or tabs on an outer surface of the sleeve portion.

10. The plumbing gripping device according to claim 6, wherein the gripping feature comprises at least three fingers equi-angularly spaced around the central axis of the sleeve portion so that, in the event the piping is inserted through the internal passage of the sleeve portion, a central axis of the piping coincides with the central axis of the sleeve portion.

11. The plumbing gripping device according to claim 6, wherein the axial length of the internal passage is at least 0.5 inch.

12. The plumbing gripping device according to claim 6, wherein the angle between the sleeve portion and the flange portion is ninety degrees.

13. The plumbing gripping device according to claim 6, wherein the gripping feature comprises a plurality of fingers located externally of the internal passage and the internal passage within the sleeve portion is uninterrupted so that the cylindrical internal surface thereof is continuous.

14. The plumbing gripping device according to claim 6, wherein the gripping feature comprises a plurality of fingers located internally of the internal passage, each finger is cantilevered within a corresponding window in the sleeve portion, and the internal passage is interrupted by the fingers and the windows so that the cylindrical internal surface of the internal passage is not continuous.

15. The plumbing gripping device according to claim 6, wherein the flange portion has a generally planar shape.

16. A plumbing gripping device for accommodating a plumbing piping having a predetermined size, supporting and securing the piping at a predetermined orientation to a through-structure as the piping passes through a hole in the through-structure, maintaining the piping at the predetermined orientation, and automatically gripping the piping as the piping is pushed through the gripping device, the gripping device comprising:

a body having a flange portion and a sleeve portion projecting from one side of the flange portion at an angle to the flange portion, the flange portion having a perimeter, the sleeve portion having a first end adjoining the flange portion, an oppositely-disposed second end, and a cylindrical internal passage through which the piping can be inserted, the internal passage having a cross-sectional diameter, a central axis, and an axial length;

at least one gripping feature located internally within the internal passage of the sleeve portion, the gripping feature being cantilevered and protruding radially inward of the internal passage toward the central axis of the sleeve portion to define an effective diameter that is less than the diameter of the internal passage;

wherein the gripping feature comprises at least three fingers located internally of the internal passage and equi-angularly spaced around the central axis of the sleeve portion so that, in the event the piping is inserted through the internal passage of the sleeve portion, a central axis of the piping coincides with the central axis of the sleeve portion, each finger is cantilevered within a corresponding window in the sleeve portion, and the internal passage is interrupted by the fingers and the windows so that an internal surface of the internal passage is not continuous; and wherein the fingers are pivotable relative to the sleeve portion so that, in the event the piping is inserted through the internal passage of the sleeve portion, each of the fingers is operable to be forced by the piping radially outward of the internal passage and automatically grip the piping while the internal passage is operable to maintain the piping at the predetermined orientation; and means for securing the body to the through-structure and retaining the sleeve portion within the hole in the through-structure, the securing and retaining means being a separate and different structure than the gripping feature such that securing the body to the through-structure and retaining the sleeve portion within the hole is independent of the gripping feature gripping the piping.

17. The plumbing gripping device according to claim 16, wherein the securing and retaining means is located on:
the flange portion and comprises fasteners configured to secure the flange portion to the through-structure; and/or the sleeve portion and produces an interference fit between the sleeve portion and the hole in the through-structure.

18. The plumbing gripping device according to claim 16, wherein the internal passage of the sleeve portion is continuous and cylindrical at the second end of the sleeve.

19. The plumbing gripping device according to claim 16, wherein each of the fingers has an arcuate surface facing the central axis of the internal passage.

20. The plumbing gripping device according to claim 16, wherein each of the fingers is completely recessed into an outer surface of the sleeve portion as a result of being located within a recess in the outer surface of the sleeve portion.

21. The plumbing gripping device according to claim 16, further comprising a sleeve surrounding the sleeve portion and enclosing the recesses in which the fingers are located.

22. The plumbing gripping device according to claim 16, wherein each of the fingers is elastically deformable to pivot radially outward away from the internal passage.

* * * * *